United States Patent
Yu et al.

(10) Patent No.: US 8,554,452 B2
(45) Date of Patent: Oct. 8, 2013

(54) ECONOMIC ISG SYSTEM AND CONTROL METHOD THEREOF

(75) Inventors: Jiyong Yu, Pocheon-si (KR); Sejun Kim, Seoul (KR); Junghwan Bang, Hwaseong-si (KR); Chongah Gwon, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 202 days.

(21) Appl. No.: 13/194,350

(22) Filed: Jul. 29, 2011

(65) Prior Publication Data

US 2012/0143481 A1  Jun. 7, 2012

(30) Foreign Application Priority Data

Dec. 1, 2010  (KR) .................. 10-2010-0121517

(51) Int. Cl.
*F02N 11/08* (2006.01)
*F02N 11/00* (2006.01)

(52) U.S. Cl.
USPC ........................................ 701/112; 123/179.4

(58) Field of Classification Search
USPC .................. 701/112, 113; 123/179.4, 179.3, 123/179.28; 477/107, 110, 111, 112, 10, 477/11, 183; 290/40 R, 40 A
See application file for complete search history.

(56) References Cited

U.S. PATENT DOCUMENTS

| | | | |
|---|---|---|---|
| 6,190,284 B1 * | 2/2001 | Kuroda et al. | 477/107 |
| 6,828,755 B1 * | 12/2004 | Iverson et al. | 320/104 |
| 7,083,020 B2 * | 8/2006 | Morimoto et al. | 180/65.26 |
| 2009/0143193 A1 * | 6/2009 | Ohshima et al. | 477/50 |

FOREIGN PATENT DOCUMENTS

| | | |
|---|---|---|
| JP | 8-74613 A | 3/1996 |
| JP | 11-257115 A | 9/1999 |
| JP | 11-348608 A | 12/1999 |
| JP | 2000-130208 A | 5/2000 |
| JP | 2000-234537 A | 8/2000 |
| JP | 2001-32917 A | 2/2001 |
| JP | 2001-207884 A | 8/2001 |
| JP | 2004-69070 A | 3/2004 |
| JP | 2008-111557 A | 5/2008 |
| KR | 10-0372438 B1 | 2/2003 |
| KR | 1020062385 A | 6/2009 |
| KR | 10-2010-0083122 A | 7/2010 |

* cited by examiner

*Primary Examiner* — Mahmoud Gimie

(74) *Attorney, Agent, or Firm* — Morgan, Lewis & Bockius LLP

(57) ABSTRACT

An ISG system makes it possible improve fuel efficiency of a vehicle by achieving an ISG system at a low cost in a vehicle equipped with an automatic transmission and considerably improve commercial quality of a vehicle by relatively reducing the parts and cost for manufacturing the vehicle, without using a sub-oil pump and a hill-start assist control device.

5 Claims, 2 Drawing Sheets

ECONOMIC ISG SYSTEM AND CONTROL METHOD THEREOF

CROSS-REFERENCE TO RELATED APPLICATIONS

The present application claims priority to Korean Patent Application Number 10-2010-0121517 filed Dec. 1, 2010, the entire contents of which application is incorporated herein for all purposes by this reference.

BACKGROUND OF INVENTION

1. Field of Invention

The present invention relates to an economic ISG (Idle Stop & Go) system, and more particularly, to a technology of implementing an ISG function at a low cost in a vehicle equipped with a common automatic transmission.

2. Description of Related Art

ISG systems improve fuel efficiency of vehicles by stopping the engine in idling, on the basis of information, such as the speed, the rotational speed of the engine, and the temperature of the cooling water when a vehicle stops.

In the related art, in order to achieve the ISG systems, an AGM (Absorptive Glass Mat) battery having charging and discharging durability, a battery sensor for estimating the states of the battery, a reinforcing starter for handling increase of the number of start times, a DC-DC converter for preventing an audio and a cluster from be reset by preventing voltage drop in restarting, and a brake boosting pressure sensor for preventing the engine from stopping under low boosting are generally needed and which are necessary parts for achieving all the ISG systems, regardless of the specifications of the transmissions of vehicles.

Further, a hill-start assist control device and a sub-oil pump are additionally required to achieve the ISG systems, when the transmission of a vehicle is an automatic transmission of the related art. The hill-start assist control device is provided to prevent a vehicle from moving back on a hill in restarting at the D-stage and the sub-oil pump is provided to maintain the hydraulic pressure of the automatic transmission, with the engine stopped.

However, additionally mounting the hill-start assist control device and the sub-oil pump in a vehicle may deteriorate the commercial quality of a vehicle, when the vehicle is a low-cost vehicle, because the number of parts and the cost increase.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an economic ISG system and a control method thereof that can improve fuel efficiency of a vehicle by achieving an ISG system at a low cost in a vehicle equipped with an automatic transmission and considerably improve commercial quality of a vehicle by relatively reducing the parts and cost for manufacturing the vehicle.

Various aspects of the present invention provide for an economic ISG system including a battery having charging and discharging durability, a battery sensor estimating the state of the battery, a reinforcing starter having durability against the increasing number of start times, a brake boosting pressure sensor, and a controller monitoring the state of the battery by using the battery sensor, restarting an engine in an idle stop state by operating the reinforcing starter with electricity from battery, determining whether to enter the idle stop state in response to a signal from the brake boosting pressure sensor, and starting/stopping the engine in accordance with the operational states of a shift lever and a brake by a driver.

Other aspects of the present invention provide for a method of controlling the economical ISG system, which comprises determining first idle stop state entry that determines whether idle stop state entering conditions are satisfied, using vehicle speed, the operational state of an acceleration pedal, and a signal from the brake boosting pressure sensor, determining second idle stop state entry that determines whether the shift lever is at the N-stage and the brake has been turned on after the determining first idle stop state entry, entering the idle stop state by stopping the engine, when the shift lever is at the N-stage and the brake has been turned on, as the result of the determining second idle stop state entry, determining first idle stop state release that determines whether the shift lever is at the D-stage and the brake has been turned on, and a first idle stop state release that restarts the engine, when the shift lever is at the D-stage and the brake has been turned on, as the result of the determining first idle stop state release.

The present invention makes it possible improve fuel efficiency of a vehicle by achieving an ISG system at a low cost in a vehicle equipped with an automatic transmission and considerably improve commercial quality of a vehicle by relatively reducing the parts and cost for manufacturing the vehicle, without using a sub-oil pump and a hill-start assist control device.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
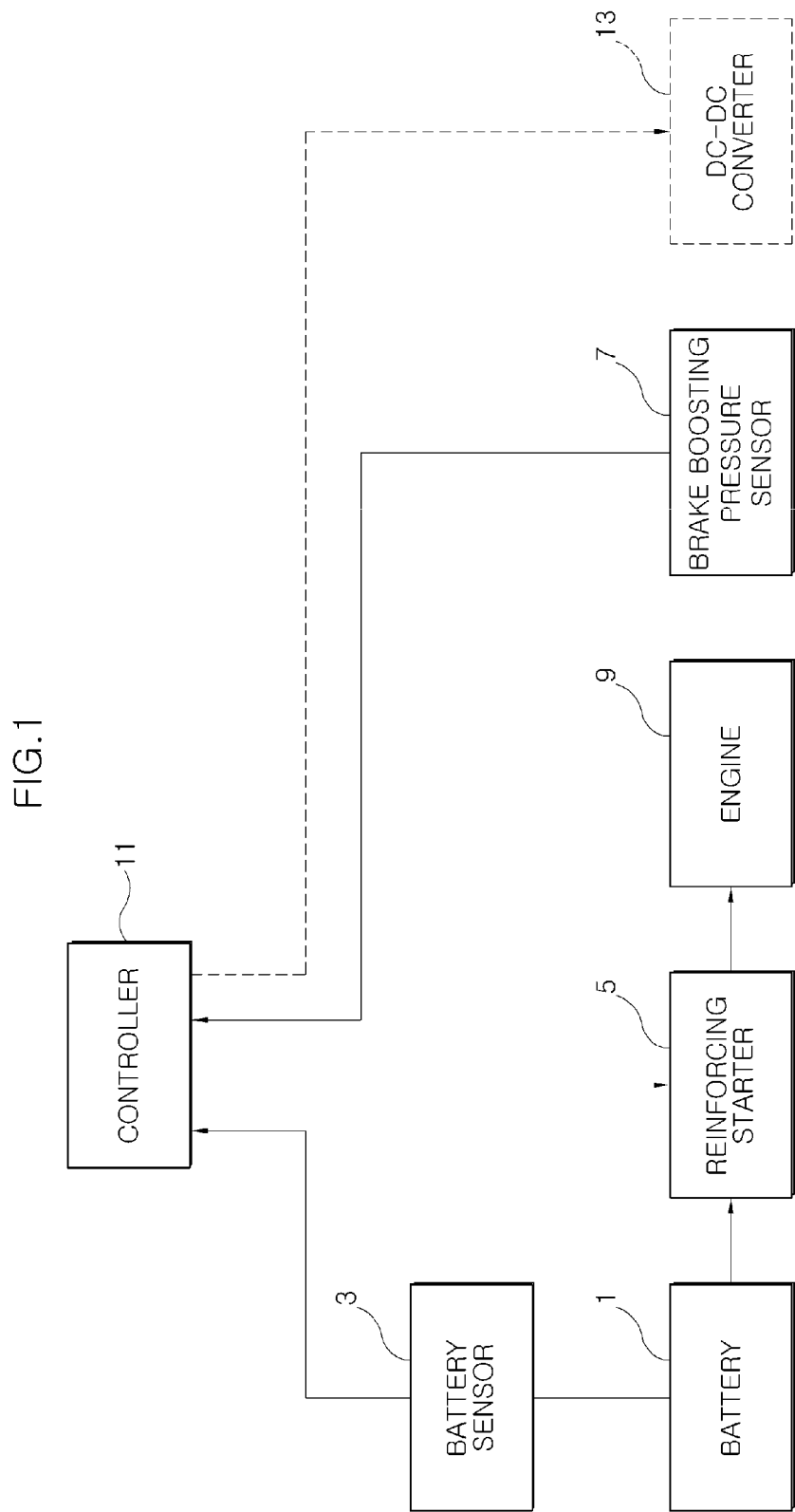
FIG. 1 is a diagram illustrating the configuration of an exemplary economic ISG according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Referring to FIG. 1, an economic ISG system according to various embodiments of the present invention includes a battery 1 having charging and discharging durability, a battery sensor 3 estimating the state of battery 1, a reinforcing starter 5 having durability against the increasing number of start times, a brake boosting pressure sensor 7, and a controller 11 monitoring the state of battery 1 by using battery sensor 3, restarting an engine 9 in an idle stop state by operating reinforcing starter 5 with electricity from battery 1, determining whether to enter the idle stop state in response to a signal from brake boosting pressure sensor 7, and starting/stopping the engine in accordance with the operational states of a shift lever and a brake by a driver.

That is, it is possible to implement an ISG function of a vehicle equipped with an automatic transmission only by using the configuration described above, in which a sub-oil pump and a hill-start assist control device of the related art are not used and their functions are implemented by the control of controller 11.

In this configuration, battery 1 may be an AGM battery and a DC-DC converter 13 is further included, as shown by a dotted line in FIG. 1, in order to prevent voltage drop in restarting engine 9 for releasing the idle stop state.

Controller 11 stops the engine to enter the idle stop state, when the shift lever is at the N-stage and the brake has been turned on, with the other idle stop entering conditions satisfied, and restarts the engine only when the shift lever is at the D-state and the brake has been turned on under the idle stop state.

A method of controlling the ISG system having the configuration described above, according to various embodiments of the present invention, is described with reference to the flowchart shown in FIG. 2.

Figure 2:
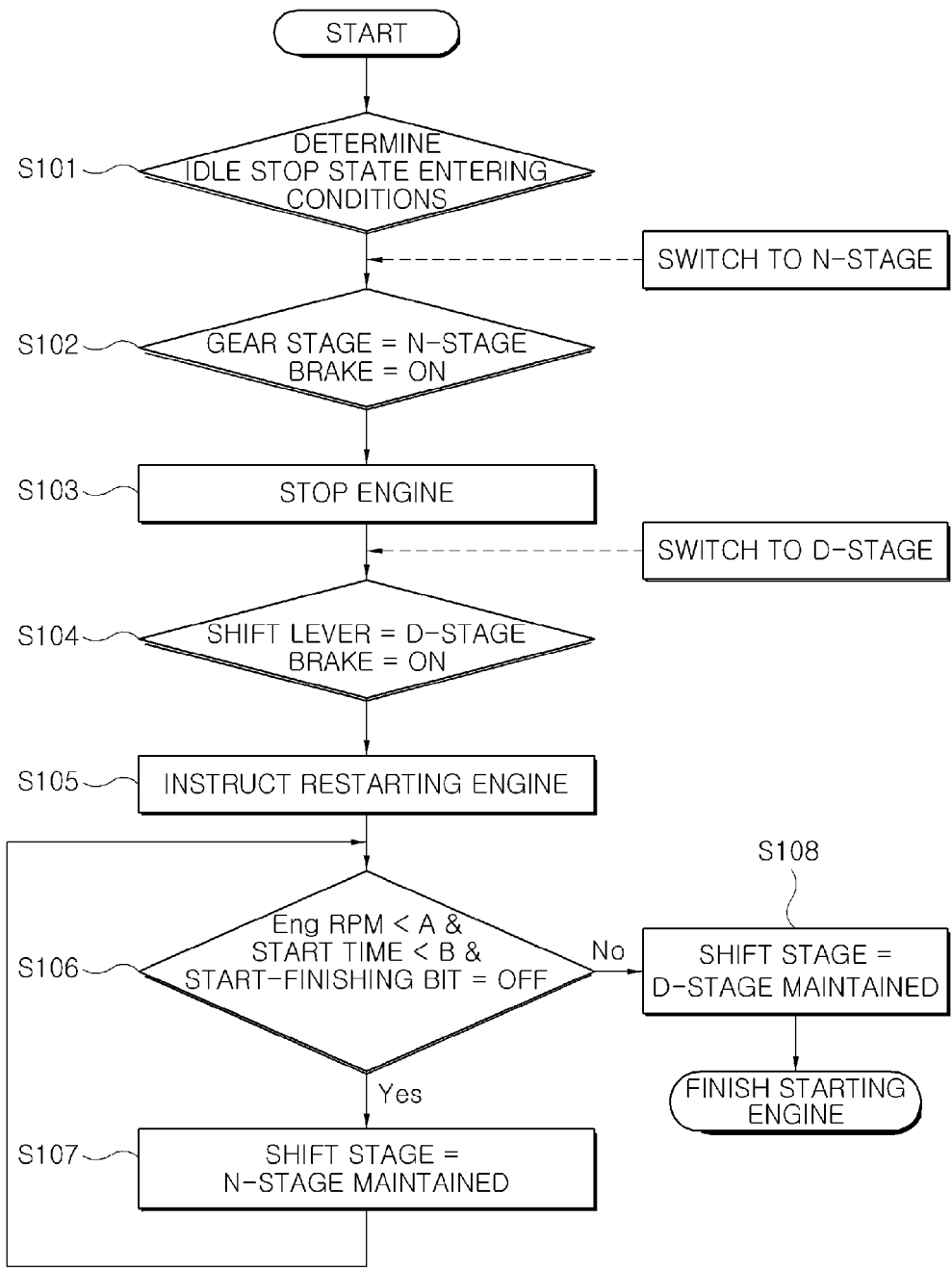
FIG. 2 is a flowchart illustrating an exemplary control method of an economic ISG system according to the present invention.

Referring to FIG. 2, a method of controlling an ISG system of the present invention includes determining first idle stop state entry (S101) that determines whether the idle stop state entering conditions are satisfied, using vehicle speed, the operational state of an acceleration pedal, and a signal from brake boosting pressure sensor 7, determining second idle stop state entry (S102) that determines whether the shift lever is at the N-stage and the brake has been turned on after the determining first idle stop state entry (S101), entering the idle stop state (S103) by stopping the engine, when the shift lever is at the N-stage and the brake has been turned on, as the result of the determining second idle stop state entry (S102), determining first idle stop state release (S104) that determines whether the shift lever is at the D-stage and the brake has been turned on, and a first idle stop state release (S105) that restarts the engine, when the shift lever is at the D-stage and the brake has been turned on, as the result of the determining first idle stop state release (S104).

That is, the determining first idle stop state entry (S101) and the determining second idle stop state entry (S102) are sequentially performed to enter the idle stop state. In the determining first idle stop state entry (S101), in the same way as an ISG vehicle of the related art, the vehicle speed, the operational state of the acceleration pedal, and a sensor from brake boosting pressure sensor 7 are received, and when it is determined that the vehicle speed is 0, the acceleration is not operated by the driver, and there is no problem in ensuring braking force even if the engine stops due to sufficient brake boosting pressure, it is determined that the conditions of the determining first idle stop state entry (S101) are satisfied and the determining second idle stop state entry (S102) is performed.

The determining second idle stop state entry (S102) substantially satisfies the conditions when the driver switches the shift lever to the N-stage. That is, unlike common ISG vehicles in the related art, the idles stop state is implemented only when the driver moves the shift lever to the N-stage while pressing down the brake pedal.

Thereafter, in the determining first idle stop state release (S104) for releasing the idle stop state, the driver should switch the shift lever that has been switched to the N-stage to the D-stage and operate the brake, in order to satisfy the conditions and prevent the vehicle from moving back even when starting on a hill. That is, it is possible to prevent the vehicle from moving back when releasing the idle stop state and starting the vehicle on a hill, even without a hill-start assist control device of the related art.

Further, various embodiments further include, after the first idle stop state release (S105), determining second idle stop state release (S106) that determines whether the hydraulic pressure of the automatic transmission is sufficiently prepared, deferring idle stop state release (S107) that maintains the shift stage of the transmission at the N-stage while the hydraulic pressure of the automatic transmission is not sufficiently prepared, as the result of the determining second idle stop state release (S106), and finishing idle stop state release (S108) that switches the shift stage of the transmission to the D-stage, when the hydraulic pressure of the automatic transmission is sufficiently prepared, as the result of the determining second idle stop state release (106).

That is, even though the engine has been started to release the idle stop state and the shift lever is at the D-stage, the N-stage is maintained until it is determined that the hydraulic pressure of the automatic transmission is sufficiently prepared, as the result of the determining second idle stop state release (S106), without substantially switching the hydraulic circuit in the transmission to the D-stage, in order to prevent a shock to the transmission even without a sub-oil pump of the related art, and then the D-stage is implemented.

In the determining second idle stop state release (S106), it may be possible to determine that the hydraulic pressure of the automatic transmission has been sufficiently prepared, when the number of revolution of the engine becomes above a first reference level.

Further, in the determining second idle stop state release (S106), it may be possible to determine that the hydraulic pressure of the automatic transmission has been sufficiently prepared, when the time passing after the engine is restarted in the first idle stop state release (S105) becomes above a second reference level.

However, in the exemplary illustrated embodiment shown FIG. 2, it is determined that the hydraulic pressure of the automatic transmission has been sufficiently prepared, when the number of revolution of the engine becomes above the first reference level in the determining second idle stop state release (S106) and the time passing after the engine is restarted becomes above the second reference level in the first idle stop state release (S105) to achieve more stable control. Further, it is determined that the hydraulic pressure of the automatic transmission has been sufficiently prepared, in further consideration of whether the state of start-finishing bit of controller 11, which is switched in consideration of other factors than the number of revolution of the engine and the time passing after the engine is restarted, has been switched to the start-on state.

The factors other than the number of revolution of the engine and the time passing after the engine is restarted, which makes the state of start-finishing bit of controller 11 switched to the start-on state, are may be, for example, engine intake manifold boosting pressure.

As described above, according to the present invention, since it is possible to achieve the ISG function in a vehicle equipped with an automatic transmission at a low cost, without a sub-oil pump and a hill-start assist control of the related art, the commercial quality of a vehicle is remarkably increased.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. The method of controlling an Idle Stop & Go (ISG) system including a battery having charging and discharging durability, a battery sensor estimating the state of the battery, a reinforcing starter having durability against the increasing number of start times, a brake boosting pressure sensor, and a controller monitoring the state of the battery by using the battery sensor, restarting an engine in an idle stop state by operating the reinforcing starter with electricity from battery, determining whether to enter the idle stop state in response to a signal from the brake boosting pressure sensor, and starting/stopping the engine in accordance with the operational states of a shift lever and a brake by a driver, the method comprising:

determining first idle stop state entry that determines whether idle stop state entering conditions are satisfied, using vehicle speed, the operational state of an acceleration pedal, and a signal from the brake boosting pressure sensor;

determining second idle stop state entry that determines whether the shift lever is at the N-stage and the brake has been turned on after the determining first idle stop state entry;

entering idle stop state by stopping the engine, when the shift lever is at the N-stage and the brake has been turned on, as the result of the determining second idle stop state entry;

determining first idle stop state release that determines whether the shift lever is at the D-stage and the brake has been turned on;

first idle stop state release that restarts the engine, when the shift lever is at the D-stage and the brake has been turned on, as the result of the determining first idle stop state release;

after the first idle stop state release, determining second idle stop state release that determines whether the hydraulic pressure of the automatic transmission is sufficiently prepared;

deferring idle stop state release that maintains the shift stage of the transmission at the N-stage while the hydraulic pressure of the automatic transmission is not sufficiently prepared, as the result of the determining second idle stop state release; and finishing idle stop state release that switches the shift stage of the transmission to the D-stage, when the hydraulic pressure of the automatic transmission is sufficiently prepared.

2. The method as defined in claim 1, wherein it is determined that the hydraulic pressure of the automatic transmission has been sufficiently prepared, when the number of revolution of the engine becomes above a predetermined first reference level in the determining second idle stop state release.

3. The method as defined in claim 1, wherein, it is determined that the hydraulic pressure of the automatic transmission has been sufficiently prepared, when the time passing after the engine is restarted in the first idle stop state release becomes above a second reference level, in the determining second idle stop state release.

4. The method as defined in claim 1, wherein, it is determined that the hydraulic pressure of the automatic transmission has been sufficiently prepared, when the number of revolution of the engine becomes above the first reference level and the time passing after the engine is restarted in the first removal becomes above the second reference level, in the determining second idle stop state release.

5. The method as defined in claim 4, wherein it is determined that the hydraulic pressure of the automatic transmission has been sufficiently prepared, in further consideration of whether the state of start-finishing bit of the controller, which is switched in consideration of other factors than the number of revolution of the engine and the time passing after the engine is restarted, has been switched to the start-on state, in the determining second idle stop state release.

* * * * *